United States Patent
Papanton

(10) Patent No.: US 6,210,732 B1
(45) Date of Patent: Apr. 3, 2001

(54) COOKING OIL ADDITIVE AND METHOD OF USING

(76) Inventor: James A. Papanton, 6540 Manor Dr., Burr Ridge, IL (US) 60521-5768

( * ) Notice: Subject to any disclaimer, the term of this patent is extended or adjusted under 35 U.S.C. 154(b) by 0 days.

(21) Appl. No.: 09/498,248

(22) Filed: Feb. 3, 2000

(51) Int. Cl.$^7$ .............................. C11B 5/00; B01J 20/10
(52) U.S. Cl. ...................... 426/417; 426/423; 426/424; 423/331; 106/600; 502/407
(58) Field of Search ..................... 426/417, 423, 426/424, 542; 423/331; 106/600; 502/407

(56) References Cited

U.S. PATENT DOCUMENTS

| | | |
|---|---|---|
| 3,557,008 | 1/1971 | Jennings . |
| 3,591,515 * | 7/1971 | Lovely . |
| 3,649,656 | 3/1972 | Tanussky . |
| 3,716,499 | 2/1973 | Inamorato . |
| 3,947,602 * | 3/1976 | Clewell ................................ 426/417 |
| 4,049,686 | 9/1977 | Ringers et al. . |
| 4,112,129 * | 9/1978 | Duensing et al. ................... 426/417 |
| 4,349,332 | 9/1982 | Blumenthal et al. . |
| 4,349,451 | 9/1982 | Friedman . |
| 4,731,332 | 3/1988 | Blumenthal et al. . |
| 4,734,226 | 3/1988 | Parker et al. . |
| 4,764,384 * | 8/1988 | Gyann ................................... 426/417 |
| 4,880,652 * | 11/1989 | Regutti ................................. 426/417 |
| 4,913,922 * | 4/1990 | Hawkes ................................ 426/417 |
| 4,915,876 | 4/1990 | Lindsay . |
| 5,004,570 | 4/1991 | Brooks et al. . |
| 5,068,115 * | 11/1991 | Liebermann ........................... 426/77 |
| 5,252,762 | 10/1993 | Denton . |
| 5,348,755 * | 9/1994 | Roy ..................................... 426/541 |
| 5,391,385 | 2/1995 | Seybold . |

FOREIGN PATENT DOCUMENTS

| | | |
|---|---|---|
| 1261453 * | 1/1972 | (GB) . |
| 58 135120 * | 8/1983 | (JP) . |

* cited by examiner

Primary Examiner—Carolyn Paden
(74) Attorney, Agent, or Firm—Welsh & Katz, Ltd.

(57) ABSTRACT

The composition of the subject invention comprises a mixture of calcium silicate and citric acid and is utilized in a method for extending the useful life of the cooking oil by blending the calcium silicate with the citric acid, introducing the mixture to the cooking oil and allowing the mixture to mix in the oil through convection currents in the oil. The oil is filtered and the composition of the subject invention is added on a daily or other basis, dependent on use.

11 Claims, No Drawings

COOKING OIL ADDITIVE AND METHOD OF USING

BACKGROUND OF THE INVENTION

This invention relates to a composition and method for rejuvenating cooking oils and more particularly, to a composition and method for treating and prolonging the life of frying oils.

Frying oils decompose over time and use due to the formation and acquisition of various contaminants during cooking. In addition, the cooking oil picks up particulate and soluble contaminants in food uses from the food being fried. These impurities detract from the taste and texture of the food and additionally the cooking process then takes longer. The accumulation of these contaminants results in a visibly darker color to the oil, which color gets darker with use, including higher levels of contaminants as well.

Generally speaking, in restaurant use frying oils may be used for approximately three to four days and then must be discarded. In this manner the quality of the food being fried can be kept uniform.

Accordingly, a principal object of the subject invention is to increase the useful life of frying oils.

SUMMARY OF THE INVENTION

This and other objects may be attained by the subject invention wherein the rate of degradation of cooking oil can be reduced, thereby extending the useful life of the oil. The composition of the subject invention reduces the build up rate of free fatty acids and polar substances, simultaneously reducing the oxidation of the oil and carbon build up on the fryer walls and burners.

The composition of the subject invention comprises a mixture of calcium silicate and citric acid and is utilized in a method for extending the useful life of the cooking oil by blending the calcium silicate with the citric acid, introducing the mixture to the cooking oil and allowing to mix in the oil through convection currents in the oil. After an initial period, the oil is filtered on a predetermined schedule and a fresh composition mixture of the subject invention is added to the filtered oil. The oil is filtered and the composition of the subject invention is added on a daily or more frequent basis, dependent on use.

DETAILED DESCRIPTION OF THE INVENTION

The subject invention involves a composition mixture of citric acid and calcium silicate and the method of so using that composition mixture for prolonging the cooking life of a frying oil.

In formulating the composition mixture, the calcium silicate is milled to a fine powder of approximately 75 microns and is a food grade synthetic amorphous precipitated calcium silicate having a bulk density of less than 1 pound per gallon, a pH of 10 (in a 5% solution), and a surface area of greater than 300 cubic meters BET.

The citric acid is also food grade and a fine powder of approximately 75 microns.

The calcium silicate is blended with the citric acid to a mixture that comprises 70%–90% calcium silicate and 10%–30% citric acid, preferably 75% calcium silicate and 25% citric acid.

In the method of the subject invention the compound mixture is introduced into the hot oil (about 275° F. to 350° F.) and its particles allowed to circulate in the oil through the natural convective movement created when heated oil on the bottom of the container rises to the top. The compound mixture of the subject invention is thus uniformly mixed and suspended in the frying oil and is immediately activated. After a predetermined period of use, sometimes 1 day, but generally every 6–8 hours, dependent on the nature and amount of use of the oil, the oil is filtered to remove crumbs and other sediment. The filtered oil is returned to the fryer and the compound mixture of the subject invention is added in an amount sufficient to prevent contamination of the oil. Generally, the appropriate amount of compound mixture to add to the oil is from 50 to 70 milliliters dry volume per 22.68 kg. (50 lbs.) of frying oil, and preferably 60 milliliters dry volume per 22.68 kg.

The preferred cooking oils and frying oils include vegetable derived, animal derived, and marine source derived fats and fatty oils that are liquids at the particular temperature that is necessary for the desired cooking effect. Illustrative sources of edible vegetable oil include canola, coconut, comgerm, cotton seed, olive, palm, peanut, rapeseed, safflower, sesame seed, soy bean and sunflower. Edible animal derived oil includes lard and tallow. Other oils may also be used. It is intended that the oils be useful for cooking at temperatures from 2750–370° F. and preferably at ranges from 300° F.–350° F. without significant deterioration for a period of time.

In evaluating the subject invention a test for determining the amount of polar substances in fats was performed as described in more complete detail in U.S. Pat. No. 4,731,332, hereinafter referred to as the Blumenthal test, by mixing a predetermined amount of a one-phase test solution with a predetermined amount of the fat. The test solution comprises an indicator and a solvent. The indicator is soluble in the solvent and the fat is substantially immiscible with the solvent. The pH of the test solution is such that the indicator in combination with polar substances extracted from the fat will provide polychromatic visible or fluorescent color changes in the test solution in response to characteristic amounts of polar substances in the fat. The indicator and solvent are present in amounts effective to provide the polychromatic visible or fluorescent color change which depends on the amount of polar substances in the fat. The fat and test solution are allowed to separate into a solvent phase and a fat phase, and the amount of polar substances in the fat is determined from the color developed in the solvent phase by comparing said developed color to a known standard. Such a test is available from Miroil of Allentown, Pa., as the Fry Quality Assurance Test-PCM.

Another test also referred to as the Blumenthal test, and used in evaluating the subject invention is described in U.S. Pat. No. 4,349,353, determines the amount of alkaline substances in used cooking fat. In this test, a predetermined amount of test solution is mixed with a predetermined amount of fat. The test solution comprises a pH indicator dye having a visible color change in the pH range of from about 2.5 to about 7.0 and a solvent in which the dye is soluble and with which the fat is immiscible. The dye and solvent are present in the test solution in amounts effective to provide a visible color change which depends upon the amount of alkaline substance, e.g., soaps, in the fat. The pH of the test solution is such that the color of the test solution prior to the mixing step corresponds to the color of the dye at the lower end of the color change range for the dye. After mixing, the fat and test solution are allowed to separate into a solvent phase and a fat phase. The amount of alkaline substances in the fat is then determined from the color developed in the solvent phase by comparing the developed color to a known standard, e.g., visually, in a calorimeter or in a spectrophotometer. Preferably, the color developed in the solvent phase is compared with a set of colors standardized so that each color corresponds to a specified amount of soap and/or other alkaline substances in the predetermined amount of fat. This test is available from Miroil of Allentown, Pa., as the Frying Quality Assurance Test-ACM.

In the Blumenthal tests of frying oils utilizing the compound mixture of the subject invention, a numerical scale was used to indicate specific color shades observed against colors depicted on a standardized color card. Thus, on the polar contaminate test referred to above, a blue color (1) indicates good oil, and becomes lighter (2), changing to light green (3) and finally dark green (4), as the oil goes bad (3 and 4 being unacceptable).

In the alkaline contaminate test, the colors vary from yellow (0) to light green (1) to dark green (2) to light blue (3) to dark blue (4) as the oil goes from good to unacceptable (2, 3 and 4 being unacceptable).

The following examples are used for illustration but do not limit the compound mixture and process of the subject invention.

EXAMPLE 1

A standard vegetable oil (canola) was used to cook chicken at 315 F. The chicken was generally cooked for 17½ minutes for white meat, and 20 minutes for dark meat; this procedure resulted in a golden colored product with a dry, crispy texture. After four days of use of the same cooking oil, the chicken took on a shiny, oily look with dark spots of color, was dehydrated and had considerable oil absorption.

EXAMPLE 2

Compound mixture of the subject invention was prepared by preparing a mixture of 75% calcium silicate with 25% citric acid. 60 milliliters (dry) of this mixture was introduced into a commercial fryer and allowed to distribute throughout the canola cooking oil through the convective action of the hot oil. The oil was brought to a temperature of 308° F. and chicken pieces were cooked therein. Chicken (white meat) was cooked for 16 minutes and chicken (dark meat) was cooked for 18½ minutes. The resulting fried product had a moist inside and a crispy outside, being golden in color with a dry, but not oily, appearance.

EXAMPLE 3

The cooking oil of Example 2 is utilized in cooking chicken for 8 continuous hours at a temperature of 350° F. After eight hours, the oil is filtered and 60 milliliters of the compound mixture of the subject invention is added. The chicken is fried in this rejuvenated oil was moist inside and crisp outside, golden in color and dry, not only in appearance.

EXAMPLES 4–6

As further examples of the subject invention, frying oil was prepared as in Example 2. French fries, onion rings, hash browns, chicken fillets and French toast sticks were fried in the oil on a generally continuous basis at 350° F. the oil was filtered every 7–9 hours of use (twice daily) and 60 ml of the compound mixture of the subject invention added after each filtering. The oil was tested at the end of every day by the Blumenthal tests described above, resulting in the noted observations. After seven days (each cycle) the oil was completely replaced with fresh oil.

| | | | EXAMPLE 4 | | | | |
|---|---|---|---|---|---|---|---|
| DAY | 1 | 2 | 3 | 4 | 5 | 6 | 7 |
| alkaline | 0 | 0 | 1 | 1 | 1 | 1 | 2 |
| polar | 1 | 1 | 1 | 1 | 2 | 2 | 3 |
| | | | EXAMPLE 5 | | | | |
| DAY | 8 | 9 | 10 | 11 | 12 | 13 | 14 |
| alkaline | 0 | 0 | 1 | 1 | 1 | 2 | 3 |
| polar | 1 | 1 | 1 | 1 | 2 | 2 | 3 |
| | | | EXAMPLE 6 | | | | |
| DAY | 15 | 16 | 17 | 18 | 19 | 20 | 21 |
| alkaline | 0 | 0 | 1 | 1 | 1 | 3 | 3 |
| polar | 1 | 1 | 1 | 1 | 2 | 2 | 3 |
| | | | EXAMPLE 7 | | | | |
| DAY | 22 | 23 | 24 | 25 | 26 | 27 | 28 |
| alkaline | 0 | 0 | 1 | 1 | 1 | 1 | 2 |
| polar | 1 | 1 | 1 | 1 | 2 | 2 | 4 |

During the period of the above test the fryers did not have to be boiled out, the foods were superior in quality, texture and with minimal absorption of oil to the food. Initially, a control was run, based on a standard work week oil, was replaced every Monday and Friday with fresh oil. The oil was filtered twice a day through a paper filter and maintained at 350° F. Testing at the end of each period, i.e., on Sunday night and on Thursday night consistently showed Blumenthal test readings for both alkaline and polar tests of 3 and 4, showing that the oil was, in fact, unacceptable. Use of the oil was extended by use of the subject invention from the standard 3–4 days to a maximum of seven days before the oil has to be discarded.

After the fourth week the test concluded and no further citric acid/calcium silicate mixture was added to the oil. After three days, unsatisfactory alkaline and polar Blumenthal test results were observed and the food quality started deteriorating.

The introduction of the citric acid/calcium silicate mixture to the existing frying and oil maintenance program increased the life of the oil from an average of 3–4 days to 7 days. The quality of the food was consistently good during the extended use cycle.

By the above, it is apparent that the compound mixture of the subject invention permitted the lengthening of the useful life of the cooking oil while also allowing a decrease in temperature in the frying session while achieving the maintenance of appearance and desired taste of the fried food.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

What is claimed is:

1. A cooking oil additive for prolonging the useful life of the cooking oil, comprising:

a mixture of citric acid and synthetic amorphous precipitated calcium silicate.

2. The additive of claim 1 wherein said mixture includes about 70% to about 90% calcium silicate about 10% to about 30% citric acid.

3. The additive of claim 1 wherein said mixture includes about 75% calcium silicate and about 25% citric acid.

4. A cooking oil mixture comprising an oil for frying food products, said oil having citric acid and calcium silicate suspended therein, the concentration of the citric acid and the calcium silicate in the oil being 60 milliliters dry volume per 22.68 kilograms of oil.

5. The mixture of claim 4 wherein the 60 milliliters of citric acid and calcium silicate is about 75% calcium silicate and about 25% citric acid.

6. A cooking oil mixture comprising an oil for frying food products, said oil having 70% to 90% calcium silicate and about 10% to 30% citric acid, suspended therein.

7. A method of prolonging the life of cooking oil comprising the steps of:

a) heating a volume of the oil in a cooking vessel;
b) adding calcium silicate and citric acid to the oil;
c) allowing the oil to circulate;
d) cooking food with the oil for six to eight hours;
e) filtering the oil to remove sediment and crumbs;
f) returning the filtered oil to the vessel;
g) adding additional calcium silicate and citric acid to the filtered oil;
h) resume cooking with the oil for six to eight hours; and
i) repeating steps e to h.

8. The method of claim 7 wherein the oil is heated to a temperature from about 275° F. to about 350° F.

9. The method of claim 7, wherein the step of adding calcium silicate and citric acid includes the step of mixing about 70% to about 90% calcium silicate with about 10% to about 30% citric acid to form a mixture.

10. The method of claim 7, wherein the step of adding calcium silicate and citric acid includes the step of mixing about 75% calcium silicate with about 25% citric acid to form a mixture.

11. The method of claim 7, wherein the calcium silicate and citric acid are suspended in the oil by the natural convection of the heated oil.

* * * * *

UNITED STATES PATENT AND TRADEMARK OFFICE
CERTIFICATE OF CORRECTION

PATENT NO. : 6,210,732 B1
DATED : April 3, 2001
INVENTOR(S) : James A. Papanton

It is certified that error appears in the above-identified patent and that said Letters Patent is hereby corrected as shown below:

<u>Column 1,</u>
Line 53, "75" should be -- 7.5 --
Line 59, "75" should be -- 7.5 --

<u>Column 2,</u>
Line 22, "2750" should be -- 275° --

Signed and Sealed this

Twenty-eighth Day of August, 2001

*Attest:*

NICHOLAS P. GODICI
*Attesting Officer*     *Acting Director of the United States Patent and Trademark Office*